Feb. 21, 1956  A. A. WICKLAND  2,735,662
SAND CONDITIONING APPARATUS
Filed Feb. 19, 1953

INVENTOR.
Algot A. Wickland
By Wilson & Geppert
Attorneys.

Feb. 21, 1956 A. A. WICKLAND 2,735,662
SAND CONDITIONING APPARATUS
Filed Feb. 19, 1953 4 Sheets-Sheet 2

INVENTOR.
Algot A. Wickland
By Wilson & Geppert
Attorneys.

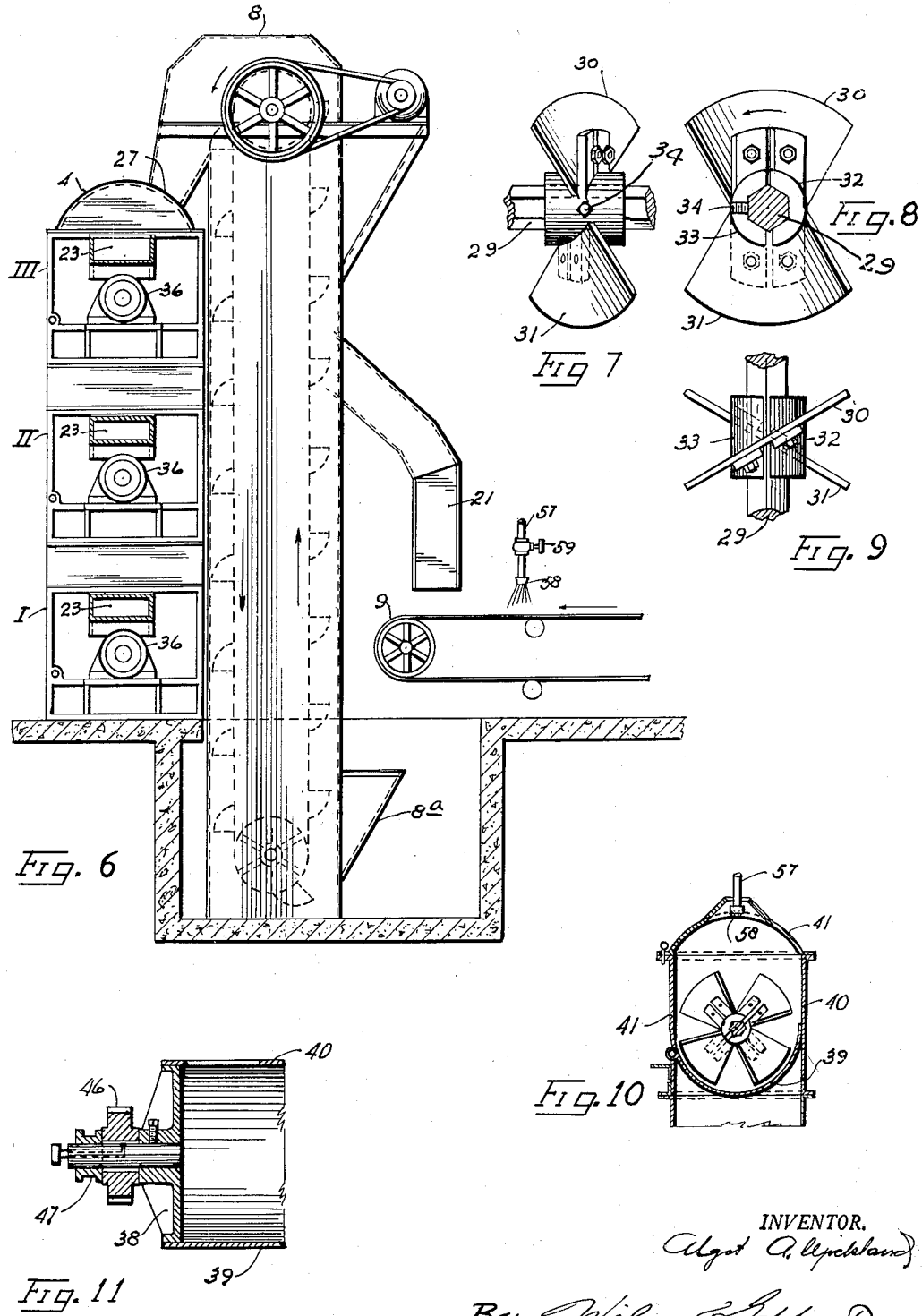

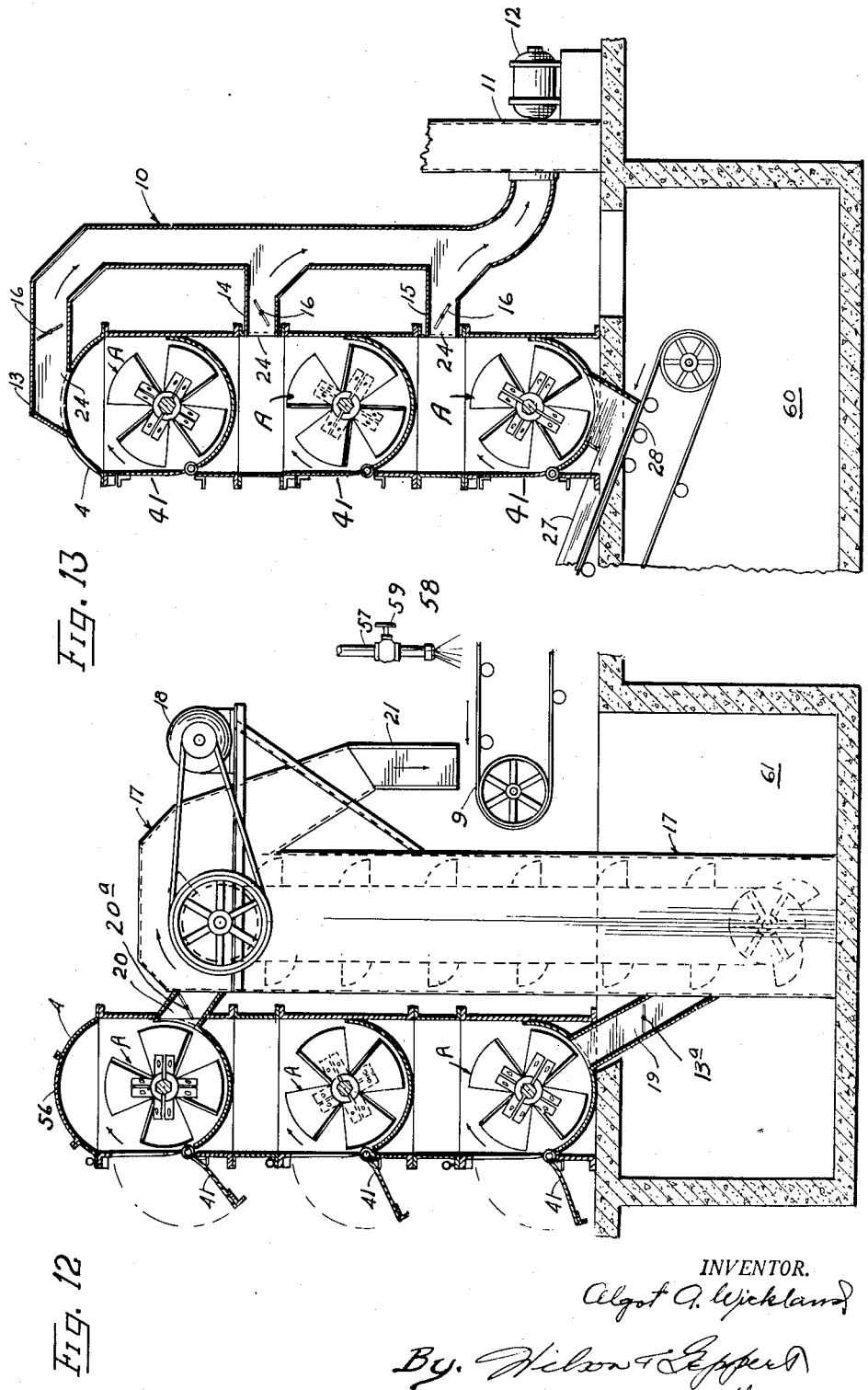

United States Patent Office 2,735,662
Patented Feb. 21, 1956

2,735,662
SAND CONDITIONING APPARATUS

Algot A. Wickland, Chicago, Ill.

Application February 19, 1953, Serial No. 337,803

4 Claims. (Cl. 259—68)

The present invention relates to improvements in continuous sand conditioning apparatus and more particularly it relates to important improvements adaptable to existing types of paddle mixers or pug mills.

It is fully recognized that the prime requisite in preparing sand for ferrous and non-ferrous molding purposes calls for a thorough coating of the grains of sand with a film of moist particles of clay or bond to effect binding or adhesion. This requires intensive mixing and blending of the sand, and further, in order to disperse the minute droplets of water which are present in the sand mixture and blend with the clay to form a binder, it is necessary to apply pressure to the sand. Water being incompressible, when pressure is applied to moist sand it will accelerate the capillary action whereby the confined water will flow through the minute interstices or crevices existing between the grains of sand and cause the colloidal matter to effectively coat the grains of sand, thereby promoting cementation, adhesion and bonding thereof.

Before mechanical devices were introduced to the foundry industry to condition molding sand, the workmen prepared the sand at night by sprinkling water on the heap, then cut it over by shoveling it into a neat pile and packed it by tamping the sand with their feet and then finished the task by pounding the surface of the pile with the back of a shovel. The following morning the men would shovel the sand through a screen to aerate it and make it open and fluffy before use.

Mechanically effecting this operation or practice requires the application of moisture, intensive blending, cooling and compressing, in addition to sufficient time for the moisture to reach and be absorbed by the clay or bond. These fundamental requirements are not satisfactorily attained by the performance of sand conditioning machinery in general use today, for the reason that when mechanical mixing is performed under certain conditions heat is generated and not enough time is allowed for the moisture to be absorbed by the clay or bond. In other types of mixers, the sand and its bonding agent are subjected to heavy pressure, but the turnover and blending of the sand is inadequate and it must be treated in individual and relatively small batches of, for example, 5 to 10 minutes before adequate bond is obtained.

It is, therefore, an important object of the present invention to provide mechanical means to secure a thorough blending of the sand and clay or bond in a most effective manner and which simulates, to a degree, that obtained by rapid hand shoveling.

Another object of the present invention is to effectively cool the sand and contained bonding agent during its passage through two or more stages of mixing, and also to subject this sand being conditioned to pressure due to normal resistance encountered in blending and conveying this sand horizontally within a restricted space from the intake to the discharge opening of successive mixing compartments.

A further object of this invention is to provide for a prolonged time element in the conditioning in which the sand is subjected to repeated countermovement in the steps of blending, cooling and moderate pressure during its passage and cascading to and from two or more successive mixing compartments.

Another important feature of the present invention relates to the present novel construction and arrangement of apparatus in which two or more paddle mixer assemblies are arranged one above the other, with provision for convenient and ready access to all moving parts for cleaning, repair or replacement. This is accomplished by providing removable mixing paddles and a hinged panel extending for the full length of the housing for convenient inspection and cleaning and for the replacement of worn out paddles.

A further important object of the present invention is to provide novel means or mechanism for recirculating the sand in batches to effect repeated blending and cooling, as may be desired or required in processing sand to meet certain requirements for special application.

Further objects are to provide a construction of maximum simplicity, efficiency, economy and ease of assembly and operation, and such further objects, advantages and capabilities as will later more fully appear and are inherently possessed thereby.

In the drawings:

Fig. 6 is a view in end elevation, the view being taken in a plane represented by the line 2—2 of Fig. 1, and showing the sand delivery belt and bucket conveyor.

Fig. 7 is an enlarged view in side elevation of one of the assembled mixing paddles on its shaft, the latter being broken away.

Fig. 8 is a view in front elevation of the mixing paddle of Fig. 7.

Fig. 9 is a top plan view of the mixing paddle of Fig. 7, but with the paddle and shaft rotated through an angle of 90° from the position shown in Fig. 9.

Fig. 10 is a fragmentary view in vertical cross section through a mixing compartment, the view being taken in a plane represented by the line 3—3 of Fig. 1.

Fig. 11 is a fragmentary view in horizontal cross section of a mixing compartment, the view being taken in a plane represented by the line 6—6 of Fig. 2.

Fig. 12 is a view in vertical cross section through the mixing and conditioning apparatus, the view being taken on the irregular line 4—4 of Fig. 1, and showing in side elevation the recirculating bucket conveyor.

Fig. 13 is a fragmentary view in vertical cross section through the novel apparatus and taken in a plane represented by the line 5—5 of Fig. 1, the view showing the mixing compartments and the connections to the exhaust system.

The same parts are designated by the same reference numerals whenever they occur in the several views.

Figure 1:
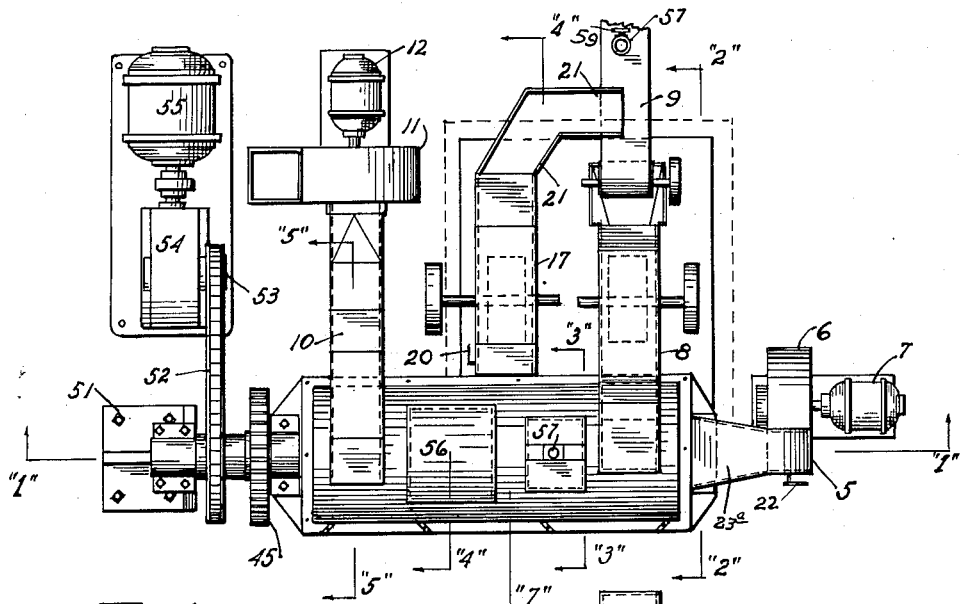
Figure 1 is a top plan view of the novel apparatus and showing the upper mixing assembly, the sand delivery belt, the bucket elevators, the blower and suction system, and the drive mechanism for operating the multiple mixers.

Referring to the disclosure in the drawings and more particularly to the novel embodiment selected to illustrate the present invention, the disclosed combination and assembly includes numerous improvements and novel features to insure dependable and continuous performance, convenient inspection and replacement of worn out parts, and optimum efficiency.

Figure 2:
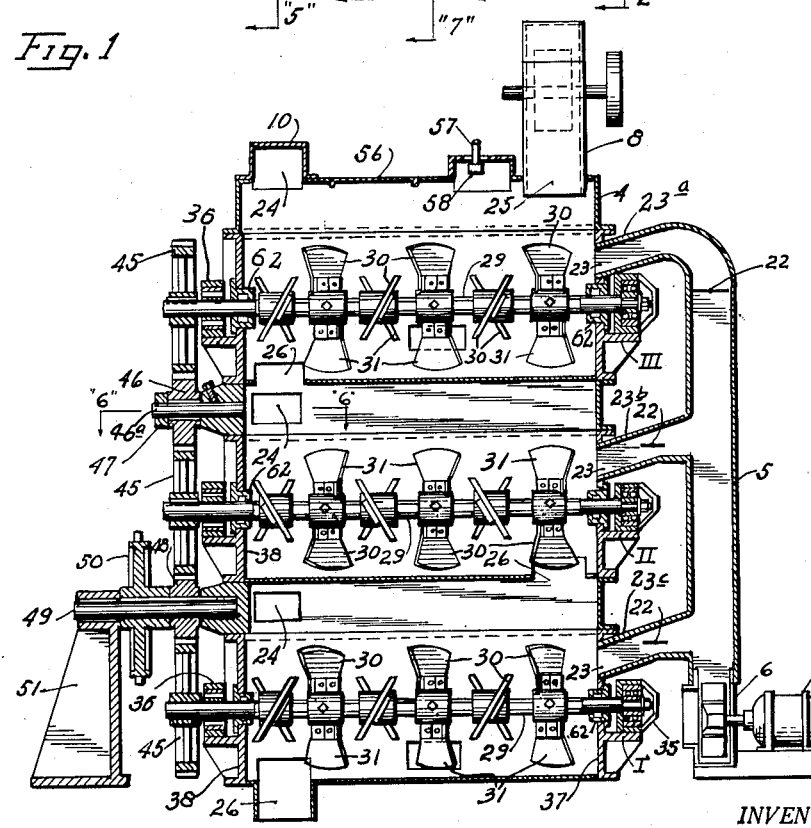
Fig. 2 is a view in vertical cross section taken longitudinally through the apparatus on the line 1—1 of Fig. 1 and viewed in the direction of the arrows.

The present assembly comprises an arrangement of three similar paddle mixers and conveyor units, arranged successively one above the other and designated I—II—III, respectively, in Figs. 2 and 6. Each consists of a compartment or chamber with assembly III differing from the others by having a hood or cover 4 provided with an inspection door 56 (Figs. 1 and 2), a water supply pipe 57 and spray nozzle 58, an intake for a sand discharge chute 27 (Fig. 6) and an outlet to an exhaust duct 24. The moving parts within each of these successively connected mixing compartments or chambers consist of a hexagonal shaft 29 supported in end bearings 35 and 36, and carrying several removable paddles A arranged in spaced relation and each keyed or clamped to the shaft with each shaft assembly driven by a spur gear 45 (Fig. 2) mounted on the exterior end of each shaft. The shaft bearings are suitably protected from damage and contact with the sand by grease shields 62 in the end walls 37 and 38.

The mixing paddles A shown in detail in Figs. 7, 8 and 9, are constructed and arranged as to permit convenient assembly, removal or replacement. Each paddle consists of four parts, namely, two cast steel hub members 32 and 33 and two hard faced steel blades 30 and 31 disposed in spaced and offset relation, and with the hub members bolted to the blades and the entire paddle assembly clamped on or secured to the driving shaft 29 by a set screw or other securing means 34.

The mixer and conveyor housing for each compartment I, II and III comprises sections 39 and 40 bolted or otherwise secured (Figs. 2, 4, 5, 10, 11, 12 and 13) to the cast iron head ends or end walls 37 and 38 which also support the bearings 35 and 36. The housing sections 39 each include a dished or cupped base and a side wall providing a panel 41 which is hinged and pivotally supported at 42 by means of a rod or shaft 43. This rod or shaft projects through and its ends are removably held in the heads or end walls 37 and 38 and the panel 41 is adapted to be locked or latched to the hood 4 in closed or raised position by means of one or more latching pins 44.

For the admission of the air blast into each compartment or chamber of the units I, II and III, the conveyor head end castings 37 each has an opening or port 23 (Fig. 2) adapted to receive a branch pipe leading to a common inlet or duct 5. This duct is connected to a blower 6 driven by a motor or power source 7. This duct and the branch pipes 23ᵇ and 23ᶜ are provided with butterfly valves 22 for controlling the volume of air blast entering the mixing compartment or chamber of each unit. At the opposite end of each compartment or chamber (Figs. 2, 3 and 13), a port or opening 24 is provided for connection to each of three branch pipes 13, 14 and 15 leading to a common exhaust duct 10 connected to an exhaust fan 11 driven by a motor 12 or other power source. A butterfly valve 16 in each branch pipe controls the exhaust therefrom.

Figures 3, 4, 5:
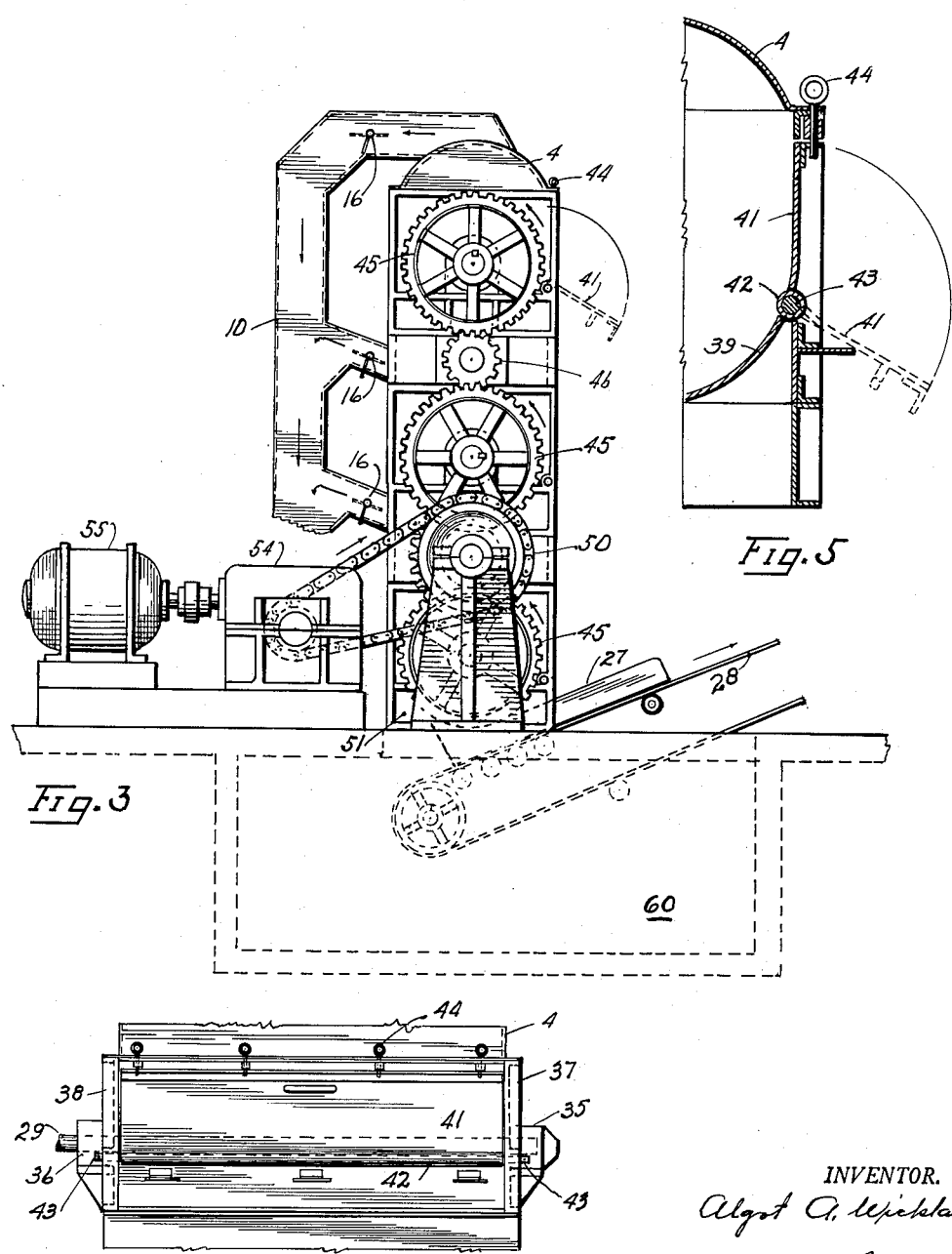
Fig. 3 is a view in end elevation and showing the main drive assembly and gearing, the view being taken from the left hand end of Fig. 1.
Fig. 4 is a fragmentary view in front elevation of the uppermost mixing compartment and inspection panel and clean-out door.
Fig. 5 is a fragmentary enlarged view in vertical cross section taken in a plane on substantially the line 7 of Fig. 1 and showing a hinged panel in closed position and also showing in dotted outline this panel in open position.

Motion is imparted to each paddle driving shaft 29 by means of a spur gear 45 keyed or pinned to the end of each shaft 29 at the exterior of the compartments or chambers, with two of these spur gears being in meshing engagement with an idler gear or pinion 46 (Figs. 1, 2 and 3) held on a stub shaft 46ᵃ by a collar 47, and the lower and intermediate spur gears 45 being in meshing engagement with and driven by a driving pinion 48 keyed or fixed to a stub or drive shaft 49 driven by a sprocket wheel 50 mounted on and also keyed or pinned to the stub shaft 49 rotatably supported in a bearing in the frame and in a pedestal 51. Sprocket wheel 50 engages and is driven by a chain 52 in mesh with a sprocket wheel 53 through a speed reducer 54 and by means of a motor 55 (Figs. 1 and 3). The speed of the paddle mixer shafts 29 generally ranges from approximately 30 to 50 revolutions per minute, depending upon the size and capacity of the apparatus.

The delivery of sand to the first or upper mixing compartment III is performed by a conventional type of bucket elevator 8 served by a conventional belt conveyor 9 (Fig. 6). Moisture additions to the sand are regulated by the spray nozzle 58 connected to a water supply pipe 57 above the sand delivery conveyor 9, and/or within the compartment or chamber III (Fig. 2). If desired, the bucket elevator 8 may be dispensed with and the sand and clay bond may be delivered directly to the first mixing compartment or chamber III by means of an inclined belt or by gravity, depending upon the general arrangement.

The sand to be conditioned enters the first or uppermost mixing chamber or compartment III through the chute 27 and inlet 25 (Figs. 2 and 6). At the same time air form the blower 6 (Fig. 2) enters the inlet ports 23 through the branch pipes 23ᵃ, 23ᵇ and 23ᶜ of the blower duct 5. Forward motion imparted to the sand (to the left in the chamber or compartment III—Fig. 2) effects thorough mixing and compression of the contents in this compartment by the revolving mixing paddles A, and this is continued until the contents reach the discharge port 26 at the other end or rear of the mixing compartment III. At this point the sand drops or falls by gravity through the outlet or discharge port 26 in the base of this compartment and into the adjacent end of the compartment II disposed therebelow, whereupon the revolving mixing paddles A in compartment II repeat the mixing, compression and delivery operations as the sand is moved from the far or rear end of this compartment toward the forward end thereof where the sand in the process of conditioning is discharged by gravity through the outlet or discharge port 26 into the forward end of the compartment I. In this latter compartment the process is repeated by the revolving mixing paddles A which mix and compress the sand therein and move or deliver this treated or conditioned sand to the point where it is finally discharged through the final discharge port or outlet 26 in the compartment or chamber I.

From this outlet or discharge port 26 in the compartment or chamber 1, the conditioned sand enters a chute 27 and passes onto a belt conveyor 28 one end of which extends into a floor pit 60 (Figs. 3 and 13), for use or disposal or for further treatment. If desired, the sand may be recirculated through the mixing and conditioning compartments. Thus should the molding sand being conditioned require further or prolonged mixing and cooling time, this can be readily accomplished by recirculating the sand in batches by opening and closing butterfly valves 13ᵃ and 20ᵃ controlling the recirculating passages and branch pipes 19 and 20, and operating a conventional bucket elevator assembly 17 (Fig. 12) through a motor 18 and suitable drive mechanism, the conveyor being adapted to receive sand from either compartment I or III through these branch pipes. The lower end of this bucket elevator extends into a floor pit 61 and adjacent its upper end it directs and discharges its contents through a discharge spout 21 onto the delivery belt 9 which in turn discharges the sand into a hopper 8ᵃ leading to the bucket elevator 8 (Fig. 6).

Ready access to the mixing paddles A may be had for cleaning, repair or replacement by means of the hinged or pivotally mounted clean-out doors or closures 41 as will be evident from Figs. 5 and 12, and the apparatus is so constructed and arranged that ready access may also be had to the other component parts should such access be required for service, assembly or repair.

The sand and the clay or bonding agent admixed therewith is fed to the novel mixing and conditioning apparatus by means of the conveyor belt 9 and under the water spray nozzle 58 (Fig. 6). Water is supplied thereto from the pipe 57 and controlled by a gate valve 59. The sand and clay or binder from this conveyor is discharged into the hopper 8ª of the bucket conveyor system 8 and carried by this bucket conveyor upwardly where it is discharged through the spout or passage 27 and the sand inlet 25 into the upper compartment III, thereafter to be acted upon by the blades 30 and 31 of the mixing paddles A in the successive compartments III, II and I.

If any one or more of the drive shafts 29 require removal or replacement, all that is required is to remove its mixing paddles A and a bearing 36 and to withdraw the adjacent grease seal or shield 62, whereupon the shaft may be withdrawn axially.

Although the term sand is frequently employed, it is to be understood that such term is intended to include a requisite amount of clay or bond that is mixed with the sand when delivered or supplied to the mixing and conditioning apparatus by the delivery conveyor 9.

Having thus disclosed the invention, I claim:

1. In a continuous sand conditioning apparatus comprising two or more sand mixing compartments mounted horizontally one above the other and having connected passages whereby sand delivered to the upper compartment is successively delivered from an upper to a lower compartment, a power driven shaft in each of said compartments and each shaft provided with removable paddles mounted thereon, said paddles being so constructed and arranged as to lift the sand, blend, compress and propel it longitudinally along the shaft from one end to the other where it is discharged into a lower compartment, each mixing compartment being enclosed but with a port opening adjacent each end in the upper portion thereof, a blower system having a common inlet duct provided with spaced branch pipes with each pipe connected to and discharging through a port opening at one end of and into the upper portion of its compartment whereby said branch pipes discharge and direct into the upper portion of one end of each compartment an air blast under pressure to impinge upon the sand, paddles and interior walls of one compartment and the underside of the mixing compartment thereabove, and an exhaust system including a common exhaust duct provided with spaced branch pipes with each pipe connected to and exhausting through a port opening at the other end of its compartment above said shaft and paddles, thereby causing a continuous flow of fresh air through each compartment and over the rotating shaft and paddles and over the sand mixture and the underside of the mixing compartment thereabove to thereby dissipate the heat from the walls of the compartments and cool and aerate the sand mixture in its travel through said compartments.

2. In a continuous sand conditioning apparatus having a housing provided with multiple mixing chambers arranged one above the other with the bottom of each chamber being dished and the bottom of an upper chamber providing the top wall of a lower chamber, means for supplying moistened sand and clay to the uppermost mixing chamber adjacent one end thereof, a spray nozzle in the uppermost mixing chamber for supplying water thereto, a horizontal drive shaft disposed in each chamber, means at the exterior of these chambers for driving the shafts, mixing paddles mounted on each shaft within the chambers and in spaced relation for blending and compressing the sand mixture and moving it lengthwise of the chambers, the paddles in the uppermost chamber moving the sand and clay from its supply end to the other end thereof where it is discharged to the adjacent end of a lower chamber, and the mixing paddles in said lower chamber blending, compressing and moving the sand mixture lengthwise of this chamber to the other end thereof for discharge thereat, and means for cooling and aerating the mixture in these chambers with each chamber having a blower system for supplying a coolant to said apparatus including an inlet port at one end of and opening into its upper portion, a common inlet duct connected to the blower and provided with branch conduits with a conduit connected to each inlet port for directing said coolant under pressure from each conduit downwardly and over the mixing paddles of a chamber, over and through the contained moistened clay and sand to aerate and cool the mixture as these paddles continuously mix, blend, compress and move this moistened clay and sand longitudinally of the chamber, and direct the coolant over the underside of the chamber thereabove for cooling this chamber and its contents, and an exhaust system for said apparatus including a common exhaust duct and branch conduits with a conduit for exhausting each chamber, an exhaust port opening into the other end of each chamber with an exhaust conduit connected to each exhaust port for exhausting the coolant from the upper portion of each chamber and maintaining a continuous flow of the coolant during the mixing, blending, compressing and moving operation for conditioning the sand mixture.

3. In a continuous sand conditioning apparatus having a housing provided with a plurality of longitudinally extending mixing chambers arranged in tiers with the bottom of each chamber being dished and the bottom of an upper chamber providing the top wall of a lower chamber, means for supplying the uppermost chamber with the sand mixture to be conditioned, means for connecting these chambers whereby the mixture treated in one chamber is discharged from one end thereof into the adjacent end of a lower chamber where it is further conditioned, multiple mixing paddles in each chamber adapted to mix, blend, compress and convey the mixture from the inlet end to the outlet end of each chamber, a blower system connected to each chamber at one end and an exhaust system connected to each chamber at the other end for the passage of air under pressure to cool and aerate the mixture in these chambers as the paddles therein mix, compress and move the mixture longitudinally through each chamber, said blower system including a common inlet duct provided with branch conduits with a conduit connected to an end of each chamber for injecting an air stream under pressure into the interior of each chamber and directing this air stream upon the sand, paddles, interior walls of each chamber and the bottom wall of an upper chamber for cooling the same and aerating the sand mixture, and said exhaust system including a common exhaust duct provided with branch conduits with a conduit at the other end of each chamber for thereat withdrawing the air after cooling and aerating the mixture.

4. In a continuous sand conditioning apparatus having a housing provided with a plurality of longitudinally extending mixing enclosures arranged vertically in tiers with openings at the opposite ends connecting said enclosures for the successive passage from the uppermost enclosure of the sand being conditioned, a drive shaft projecting through each enclosure, bearings and drive means for each shaft disposed at the exterior of each enclosure with each shaft projecting through openings in the end walls of its enclosure, grease seals assembled in the end walls and insertable and removable from the exterior thereof, said seals encompassing each shaft adjacent its opposite ends and sealing the openings in the end walls, mixing and impelling paddles arranged in spaced relation along said shafts within each enclosure with the blades arranged to mix, compress and move the sand being conditioned in opposite directions in adjacent enclosures, means for rigidly but removably mounting the paddles on each of said shafts, a panel for each enclosure extending for the length of and providing a side wall of each enclosure and means for hingedly mounting each panel for convenient access to the interior of each enclosure including access to the paddles for their assembly, inspection or removal, the removal of a bearing and its adjacent grease seal from about a shaft permitting ready removal or replacement of such shaft for complete inspection including replacement of worn parts and for periodic cleaning.

References Cited in the file of this patent

UNITED STATES PATENTS

| | | | |
|---|---|---|---|
| 410,018 | Phillips | Aug. 27, | 1889 |
| 445,703 | Parry | Feb. 3, | 1891 |
| 841,657 | Atkinson | Jan. 22, | 1907 |
| 1,101,104 | Swane | June 23, | 1914 |
| 1,311,827 | McDole | July 29, | 1919 |
| 1,467,715 | Donkers | Sept. 11, | 1923 |
| 1,644,692 | Read et al. | Oct. 11, | 1927 |
| 1,877,010 | Miscampbell | Sept. 13, | 1932 |
| 2,101,620 | Lewis | Dec. 7, | 1937 |
| 2,235,311 | Bullard | Mar. 18, | 1941 |
| 2,237,787 | Marshall | Apr. 8, | 1941 |
| 2,600,408 | Komarek | June 17, | 1952 |